United States Patent
Longobardi et al.

(10) Patent No.: US 7,822,748 B2
(45) Date of Patent: *Oct. 26, 2010

(54) METHOD AND SYSTEM FOR DELIVERING INFORMATION WITH CACHING BASED ON INTEREST AND SIGNIFICANCE

(75) Inventors: Roberto Longobardi, Rome (IT); Antonio Perrone, Roma (IT)

(73) Assignee: International Business Machines Corporation, Armonk, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 12/362,936

(22) Filed: Jan. 30, 2009

(65) Prior Publication Data
US 2009/0157806 A1    Jun. 18, 2009

Related U.S. Application Data

(63) Continuation of application No. 11/333,441, filed on Jan. 17, 2006, now Pat. No. 7,490,080.

(30) Foreign Application Priority Data

Jan. 28, 2005    (EP)    ................... 05100566

(51) Int. Cl.
G06F 7/00    (2006.01)
G06F 17/00    (2006.01)

(52) U.S. Cl. .................... 707/736; 707/741
(58) Field of Classification Search .......... 707/999.002, 707/999.005, 736, 741
See application file for complete search history.

(56) References Cited

U.S. PATENT DOCUMENTS

| 6,032,228 | A | 2/2000 | Islam et al. |
| 6,038,601 | A | 3/2000 | Lambert et al. |
| 6,098,064 | A | 8/2000 | Pirolli et al. |
| 6,138,141 | A | 10/2000 | DeSimone et al. |
| 6,366,978 | B1 | 4/2002 | Middleton et al. |
| 6,711,586 | B1 | 3/2004 | Wells |
| 7,080,139 | B1 | 7/2006 | Briggs et al. |
| 7,096,418 | B1 | 8/2006 | Singhal et al. |
| 7,146,415 | B1 | 12/2006 | Doi |
| 2002/0083148 | A1 | 6/2002 | Shaw et al. |
| 2003/0120640 | A1 | 6/2003 | Ohta et al. |
| 2003/0130982 | A1 | 7/2003 | Kasriel et al. |
| 2005/0049960 | A1 | 3/2005 | Yeager |
| 2006/0206383 | A1 | 9/2006 | Litt et al. |
| 2007/0276940 | A1 | 11/2007 | Abraham et al. |

*Primary Examiner*—Vincent Boccio
(74) *Attorney, Agent, or Firm*—Yee & Associates, P.C.; Jill A. Poimboeuf (57) ABSTRACT

A method (200) for delivering information (for example, monitoring data) is proposed. The information is collected (235) on a central server (110) from remote sources (105), in order to be provided to multiple clients (120) in response to corresponding requests. In the method of the invention, an interest index is calculated (280) according to the number of preceding requests of the information that have been submitted in the past (so as to estimate the interest of the clients for the information); moreover, a significance index is calculated (220) according to a probability of a current value of the information that is uploaded onto the server by the corresponding source (so as to estimate its importance for the clients). A frequency for refreshing the information on the server can then be determined (245) according to both the interest index and the significance index. In this way, the refresh frequency self-adapts to the expected behavior of the clients.

12 Claims, 6 Drawing Sheets

METHOD AND SYSTEM FOR DELIVERING INFORMATION WITH CACHING BASED ON INTEREST AND SIGNIFICANCE

This application is a continuation of application Ser. No. 11/333,441, filed Jan. 17, 2006, status allowed.

TECHNICAL FIELD

The present invention relates to the data processing field. More specifically, the present invention relates to the delivering of information in a data processing system.

BACKGROUND ART

Data processing systems are routinely used to deliver information in interactive applications (wherein the information is typically displayed on a monitor in real-time). Particularly, in a system with distributed architecture the required information is provided by one or more remote source computers. In this case, the information is typically collected on a central server computer (from the different source computers); multiple client computers can then download the information from the server computer when it is necessary. A typical example is a monitoring application (such as the "IBM Tivoli Monitoring, or ITM"), wherein monitoring data indicative of the performance of different managed computers is measured on each one of them; the monitoring data is then collected on the server computer, where it is available for downloading by one or more operators. This allows the operators to track the health and performance of the system; for example, the operators can detect any critical condition of the managed computers. In this case, they typically download further information for analyzing the critical condition more in detail and possibly identifying its cause (so as to take corresponding correction actions).

In this context, it is generally untenable to trigger the collection of the information from the source computers synchronously (i.e., when a corresponding request is received from every client computer). Indeed, this approach involves a very high response time for the client computers (since each request cannot be satisfied until the collection of the requested information has been completed).

A solution known in the art is of collecting the information on the server computer periodically, and then storing it into a cache memory. As a result, the information is immediately available on the server computer when it is requested; moreover, next requests for the same information at short intervals can be satisfied by the server computer directly without requiring multiple collections from the corresponding source computers.

A critical aspect of the above-described solution is the choice of a refresh frequency of the information on the server computer. Indeed, a too low refresh frequency would impair the currency of the information that is delivered to the client computers (since the client computers receive the information as it was when collected from the source computers ahead of the actual request). Conversely, a too high refresh frequency would overload the system, with a detrimental impact on its overall performance.

Another problem arises when more source computers try to upload information onto the server computer at the same time. As a consequence, contention problems on the server computer can occur. This adversely affects the response time of the client computers (especially when the processing time required for the collection of the information is not negligible, and then the server computer might remain busy for a quite long period).

SUMMARY OF THE INVENTION

According to the present invention, the idea of dynamically updating the refresh frequency of the information is suggested.

Particularly, an aspect of the invention provides a method for delivering information in a data processing system from a server entity to one or more client entities. The method includes the following steps for each of at least one information item. At first, a current value of the information item is collected on the server entity from a corresponding source entity according to a corresponding refresh frequency. The current value of the information item is then delivered from the server entity to each one of the client entities (in response to a corresponding request). The method further includes the step of determining an interest index of the information item. The interest index is indicative of an interest of the client entities for the information item; this index is determined according to preceding requests for the information item that have been submitted by the client entities previously. The refresh frequency of the information item is then updated according to the corresponding interest index.

The proposed solution allows self-tuning the refresh frequency, so as to adapt it to the expected behavior of the client entities. For example, the refresh frequency can be increased for information that is likely to be requested at short intervals, whereas it can be reduced for information that is of less interest.

Particularly, the refresh frequency is based on the interest that has been demonstrated by the client entities in the past (and it is then likely to apply to the near future as well).

This provides a high currency of the information when it is actually necessary; at the same time, the workload of the system is optimized (since the refresh of the information is delayed when it is less useful).

Moreover, the refresh frequencies of the information provided by the several source entities will be generally different. This strongly reduces the risk of having any contention on the server entity for the collections of the information (since they generally occur in a completely asynchronous manner).

The different embodiments of the invention described in the following provide additional advantages.

For example, in a preferred embodiment the refresh frequency also depends on a significance index of the information item; this index represents a significance of the current value of the information item for the client entities, and it is determined according to its information content.

The proposed feature completes the solution by better adapting the refresh frequency to the actual behavior of the client entities that is likely to occur; for example, the refresh frequency can be increased for information that is very important (and then it is likely to be requested shortly), whereas it can be reduced for information that is of less value.

A suggested choice for determining the interest index is of calculating it according to a number of the preceding requests for the information item (being submitted by the client entities in a predetermined period).

This algorithm allows estimating the interest that has been demonstrated by the client entities for the information in the past in a very simple manner.

In a specific implementation of the invention, the significance index is determined by classifying the current value of the information item into a corresponding category (to which a predefined significance index has been associated).

The proposed algorithm provides the desired result with a very low computation complexity.

Alternatively, the significance index can be based on a probability that is estimated for the current value of the information item (according to a set of preceding values thereof).

This choice improves the accuracy of the solution (with a slightly increase of its complexity); moreover, the process now dynamically self-adapts to the different values of the information that is actually collected.

Preferably, the significance index is determined on the source entity, and it is then transmitted to the server entity together with the corresponding information item; on the other hand, the refresh frequency is updated on the server entity accordingly and returned to the source entity.

As a result, the operations relating to the determination of the significance indexes (being peculiar for each information item) are distributed throughout the source entities, so as to prevent overloading the server entity; at the same time, the common operations relating to the determination of the interest indexes are centralized on the server entity (taking advantage of the direct availability of the statistics data that might be necessary).

As an additional enhancement, the refresh frequency of the information item is modulated according to a substantially random value.

This further reduces the risk of contention on the server entity.

A further aspect of the present invention provides a computer program for performing the above-described method.

A still further aspect of the invention provides a program product embodying this computer program.

Another aspect of the invention provides a corresponding data processing system.

The characterizing features of the present invention are set forth in the appended claims. The invention itself, however, as well as further features and advantages thereof will be best understood by reference to the following detailed description, given purely by way of a nonrestrictive indication, to be read in conjunction with the accompanying drawings.

DETAILED DESCRIPTION OF THE PREFERRED EMBODIMENT(S)

Figure 1A:
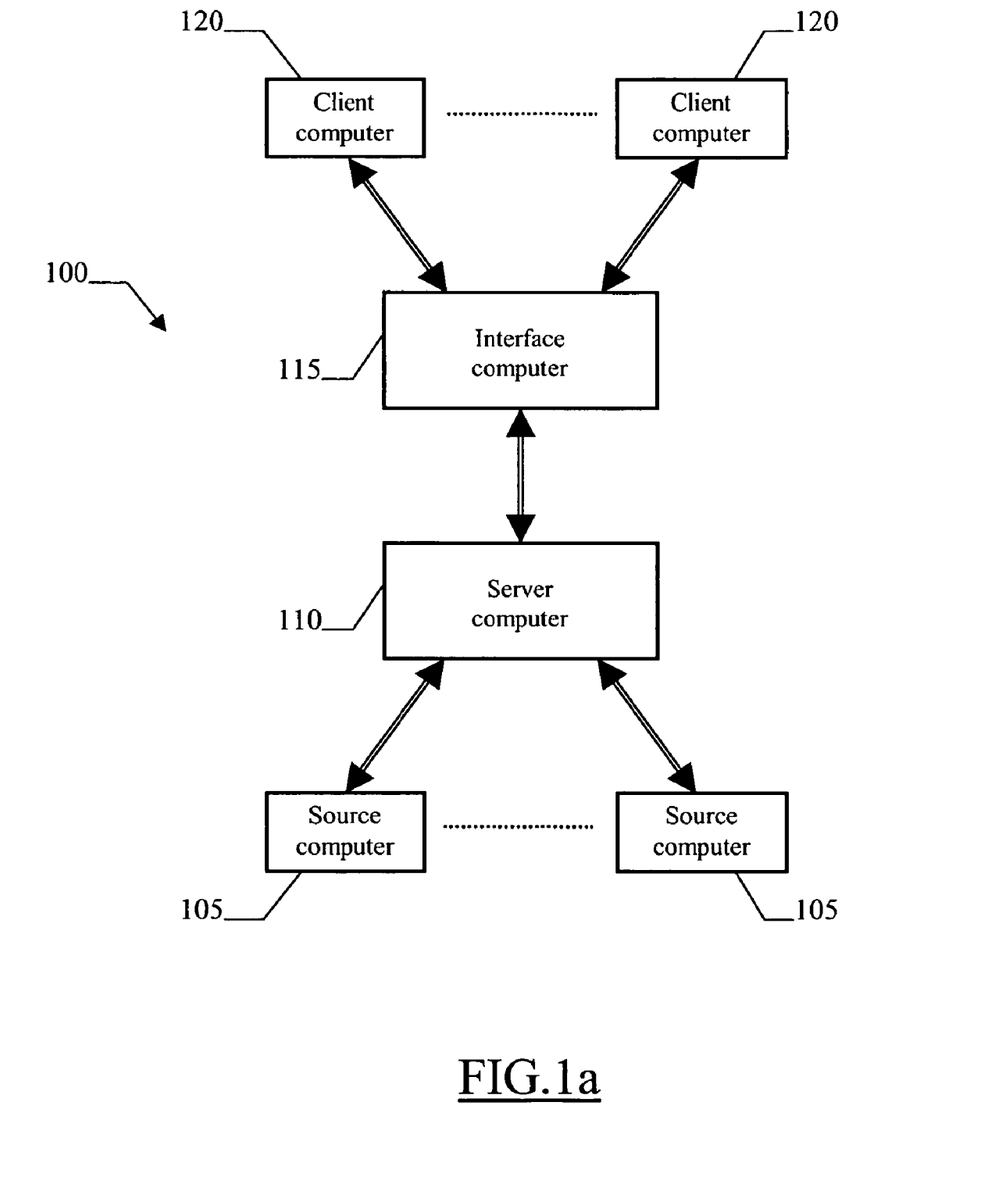
FIG. 1a is a schematic block diagram of a data processing system in which the solution according to an embodiment of the invention is applicable.

With reference in particular to FIG. 1a, a data processing system 100 with distributed architecture is illustrated. The system 100 includes multiple source computers 105, each one providing corresponding information. The information is collected (from the different source computers 105) on a central server computer 110. The server computer 110 communicates with an interface computer 115. The interface computer 115 delivers the collected information to multiple client computers 120 on demand.

For example, the system 100 runs a monitoring application that is used to trace operation of the source computers 105 (representing the entities that are managed in the monitoring application); in this case, the information consists of monitoring data of the source computers 105. Typically, the information provided to the client computers 120 is displayed on a console of an operator; this allows the operator to monitor the health and performance of the system 100.

Figure 1B:
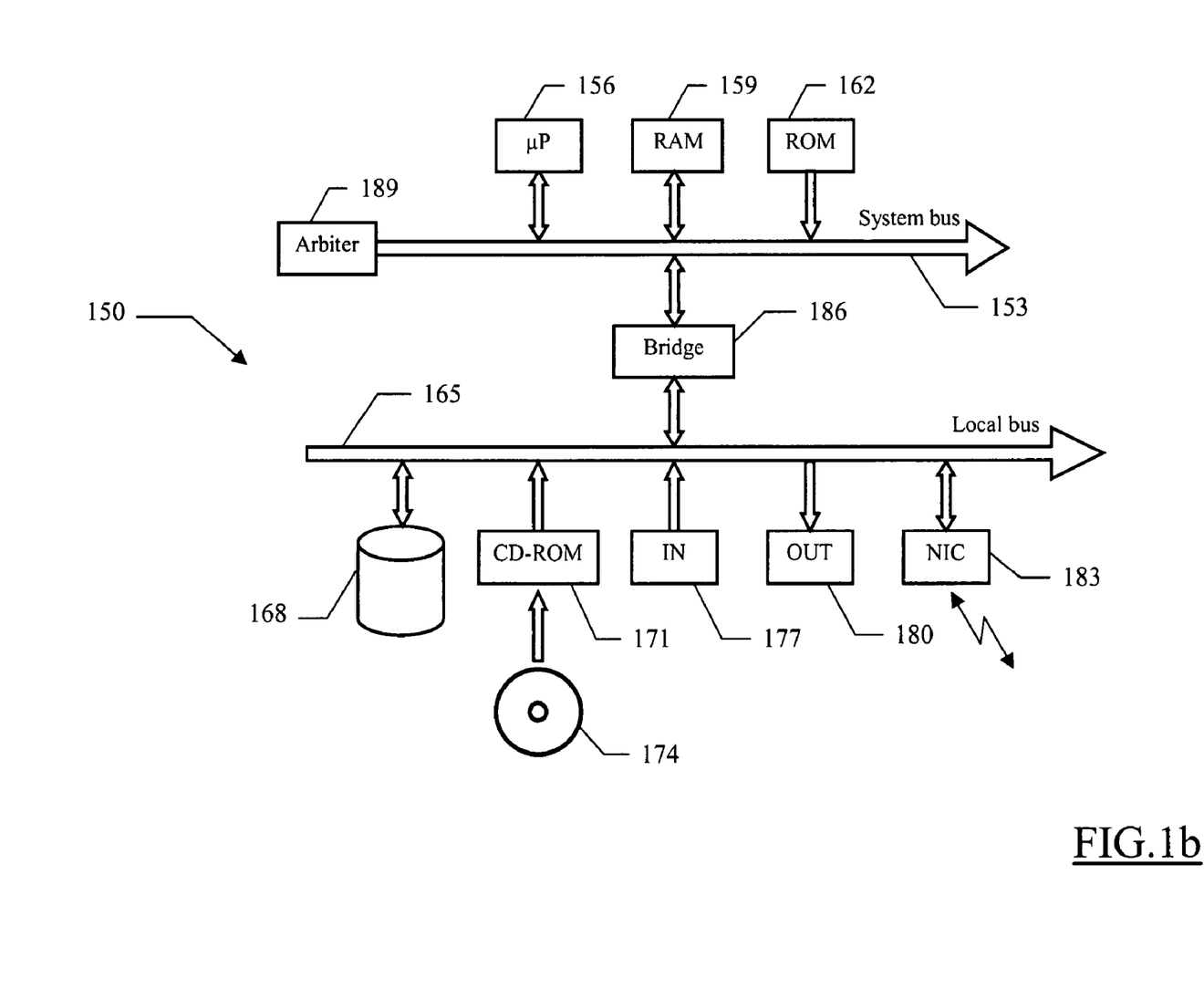
FIG. 1b shows the functional blocks of an exemplary computer of the system.

As shown in FIG. 1b, a generic computer of the system (source computer, server computer, interface computer, or client computer) is denoted with 150. The computer 150 is formed by several units that are connected in parallel to a system bus 153. In detail, one or more microprocessors ($\mu P$) 156 control. operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to a network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
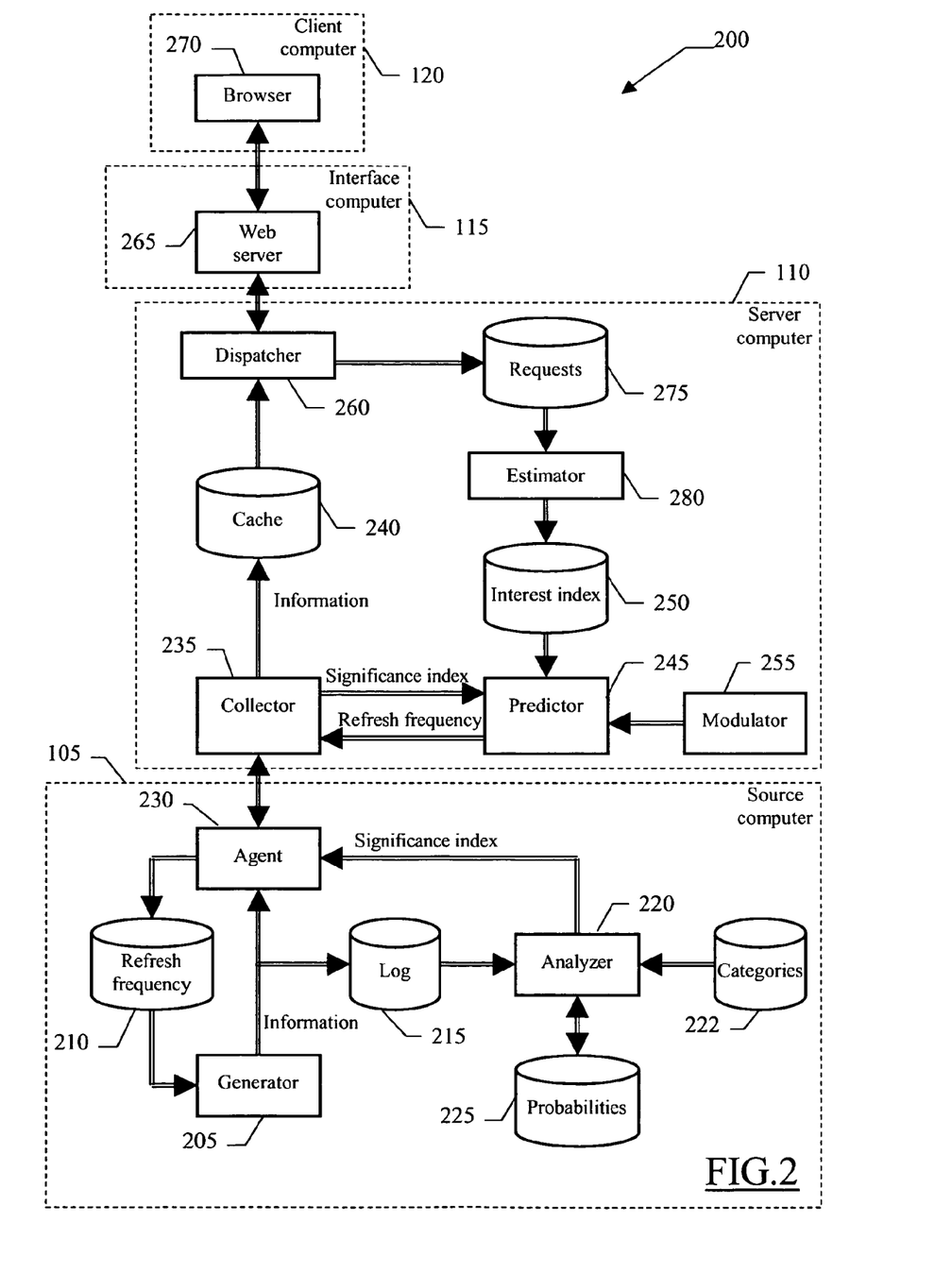
FIG. 2 depicts the main software components that can be used for practicing the solution according to an embodiment of the invention.

Moving now to FIG. 2, the main software components that run on the above-described system are denoted as a whole with the reference 200. The programs and the data are typically stored on the hard disks and loaded (at least partially) into the working memories of the computers when the programs are running. The programs are initially installed onto the hard disks from CD-ROMs.

Considering in particular a generic source computer 105, a module 205 generates a current value of the relevant information. In the example at issue, the generator 205 measures performance parameters of different hardware and/or software resources of the source computer 105 (for example, a processing power consumption, a memory space usage, a bandwidth occupation, and the like); monitoring data is then derived from those performance parameters (either directly or after an analysis thereof).

The generator 205 is activated continually according to a corresponding refresh frequency, which is stored in a file 210. The information so obtained is saved into a local log 215. The log 215 is accessed by an analyzer 220. As described in detail in the following, the analyzer 220 determines a significance index of the information; this index represents the (alleged) significance of the current value of the information for the client computers. For this purpose, the analyzer 220 can access two different databases 222 and 225. The database 222 stores the definition of a set of (disjoint) categories for the information, together with corresponding predefined significance indexes. The categories are defined by properties (or attributes) of the values of the information; for example, the categories identify a low, a standard, a high, a critical and a severe workload of the source computer 105 (each one defined by a corresponding range of values). On the other hand, the database 225 stores statistics data of preceding values of the information (which statistics data is updated by the analyzer 220 itself); for example, the database 225 includes the running probabilities for predefined ranges of values of the information.

An agent 230 receives the current value of the information (from the generator 205) and the corresponding significance index (from the analyzer 220). The agent 230 uploads the current value of the information and its significance index onto the server computer 110 (according to the refresh frequency); the agent 230 also receives a new refresh frequency from the server computer 110, and stores it into the corresponding file 210 (overriding its preceding value).

The current value of the information and its significance index are received by a collector 235 (running on the server computer 110); in this way, the source computer 105 and the server computer 110 operate according to a push paradigm (wherein the information is transmitted by the agent 230 of its own motion according to the refresh frequency). The current value of each information item collected by the module 235 (from the different source computers of the system) is stored into a cache memory 240 (replacing its preceding value).

At the same time, the collector 235 provides the significance index (of the information that has just been received) to a predictor 245. As it will be apparent in the following, the predictor 245 calculates the new refresh frequency of the information. The operation is based on the significance index (received from the collector 235) and on an interest index (which is extracted from a corresponding repository 250); this further index represents the interest that has been demonstrated in the past (and it is then likely to apply to the near future as well) by the client computers for the information. The predictor 245 also receives a modulation value from a module 255, and updates the refresh frequency accordingly. The new refresh frequency so obtained is then returned to the collector 235 (so as to be transmitted to the corresponding source computer 105).

The cache memory 240 is accessed by a dispatcher 260. The dispatcher 260 communicates with a web server 265 running on the interface computer 115. The module 265 exposes a web interface, which is accessed by each client computer 120 through a corresponding browser 270. The web server 265 bridges between the browser 270 and the dispatcher 260. Particularly, the web server 265 allows the client computer 120 to submit requests for a desired information item; in response thereto, the dispatcher 260 extracts the available value of the information from the cache memory 260 and delivers it to the client computer 120.

The dispatcher 260 also maintains a database 275, which stores statistics data of the received requests; for example, for each information item the database 275 includes the number of preceding requests that have been submitted by all the client computers of the system in a predetermined period (for example, the last 1-5 minutes). The database 275 is accessed by an estimator 280. As described in detail in the following, the estimator 280 determines a new interest index of the information that has just been requested; the new interest index so obtained is stored into the corresponding repository 250 (replacing its preceding value).

Figure 3A:
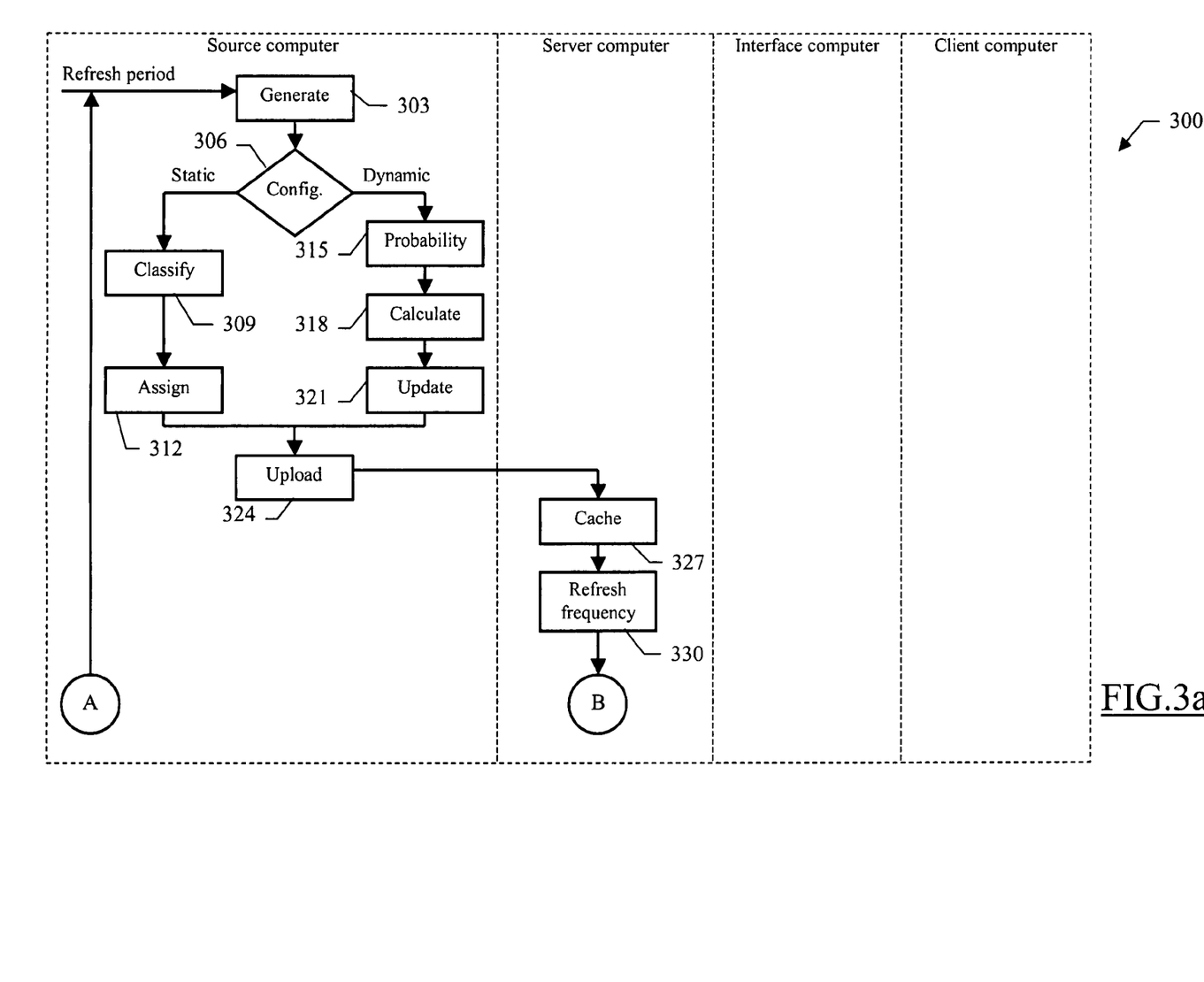
FIGS. 3a-3b show a diagram describing the flow of activities relating to an implementation of the solution according to an embodiment of the invention.
Figure 3B:
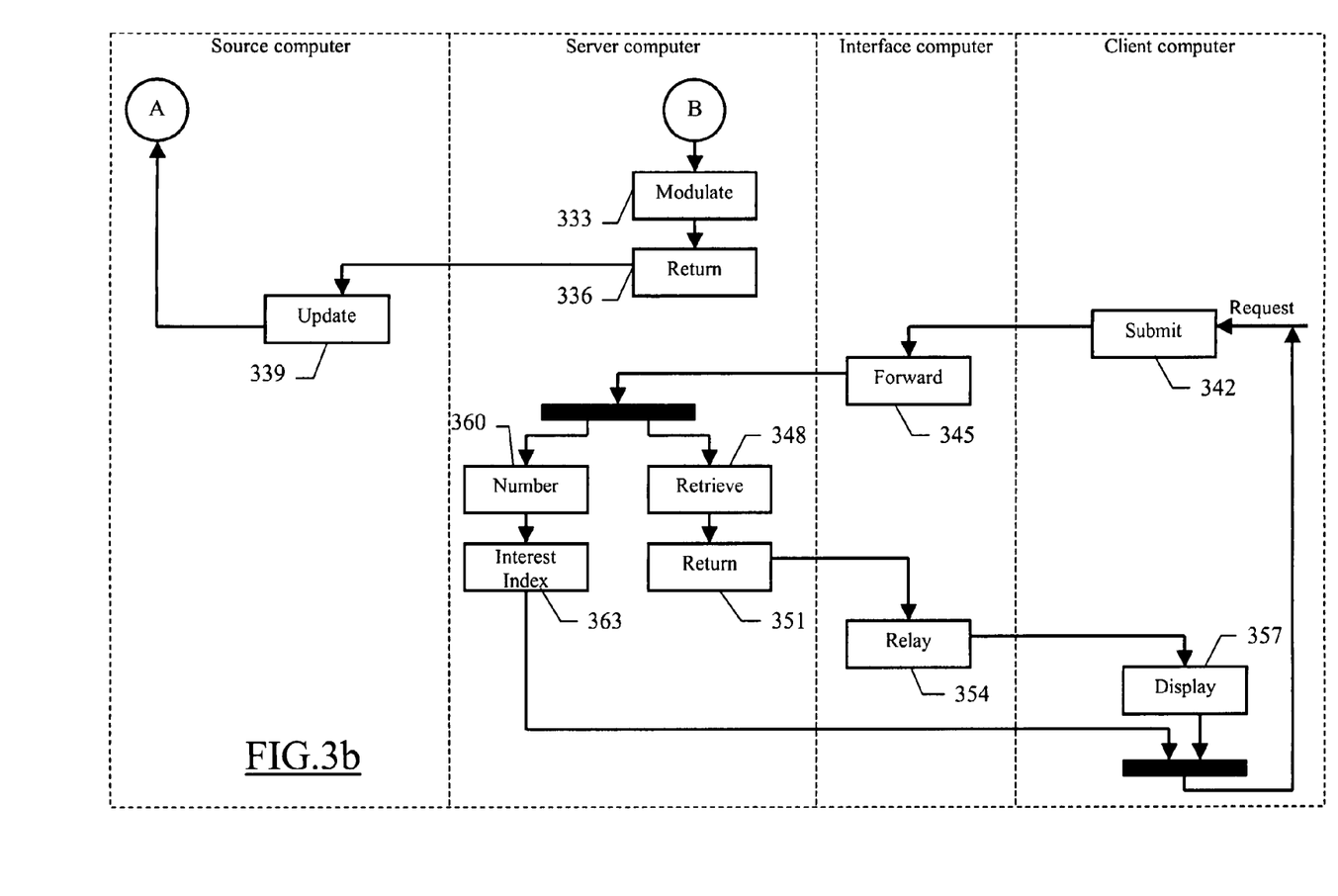

Considering now FIGS. 3a-3b, the logic flow of a monitoring process that can be implemented in the above-described system is represented with a method 300. The method starts at block 303 (in the swim-lane of a generic source computer) as soon as a period corresponding to the refresh frequency expires; in response thereto, a current value of the relevant information is generated. The flow of activity then branches at block 306 according to a configuration of the source computer. If the source computer operates in a static mode, the blocks 309-312 are executed, whereas if the source computer operates in a dynamic mode the blocks 315-321 are executed; in both cases, the method merges at block 324.

Considering now block 309 (static mode), the current value of the information is classified into one of the available categories; in the example at issue, the monitoring data is compared with the predefined ranges for its value (so as to determine whether it is indicative of a low, a standard, a high, a critical or a severe workload of the source computer). Continuing to block 312, the method assigns the significance index associated with the determined category to the current value of the information. Typically, the significance index is set to low values (such as from 0.5 to 1) for categories relating to standard situations; conversely, the significance index is set to high values (such as from 1 to 1.5) for categories relating to anomalous situations; moreover, it is set to far higher values (such as from 1.5 to 2) for categories relating to dangerous situations that would require a prompt attention.

With reference instead to block 315 (dynamic mode), the probability of the current value of the information is estimated (according to the available statistics data of the preceding values thereof). The significance index of the information is then calculated at block 318 from the probability of its current value; for example, denoting with Is the significance index and with Pc the probability of the current value of the information, we can have:

$$Is=2-1.5 \cdot Pc$$

In this way, the significance index takes low values for high probabilities (i.e., standard situations), down to Is=0.5 for Pc=1; conversely, the significance index takes high values for low probabilities (i.e., anomalous or dangerous situations), up to Is=2 for Pc=0. The method then passes to block 321, wherein the running probabilities of the values of the information (in the corresponding database) are updated according to the current value that has just been generated.

Moving now to block 324, the current value of the information and the corresponding significance index are uploaded onto the server computer. The flow of activity then proceeds to block 327 in the swim lane of the server computer, wherein the current value of the information is stored into the corresponding cache memory. The new refresh frequency for the information is calculated at block 330 (according to the corresponding significance index and interest index); for example, denoting the fr the refresh frequency and with Ii the interest index, we can have:

$$fr=Is \cdot Ii$$

As it will be evident in the following, the interest index represents a frequency value (for the refresh of the information); on the other hand, the above-described significance index represents an adjusting factor (ranging from 0.5 to 2 in the example at issue). Therefore, the interest index substantially defines the desired refresh frequency; the significance index changes the refresh frequency by decreasing it for values lower than 1 (relating to information being not particularly valuable) or by increasing it for values higher than 1 (relating to information being very valuable).

The method continues to block 333, wherein the refresh frequency is updated according to the modulation value. Preferably, the modulation value consists of a pseudo-random number (for example, ranging from −0.1 to +0.1); in this case, the refresh frequency is decreased or increased by a corresponding fraction, that is (denoting with M the modulation value):

$$fr=fr+M \cdot fr$$

As a result, the refresh frequency is modulated around the desired value (at most of ±10% in the example at issue); this provides a random scattering of the refresh frequency, thereby decorrelating the operation of any multiple source computers providing the same information (and then with the same refresh frequency).

The new refresh frequency so obtained is returned to the source computer at block 336. In response thereto, the source computer at block 339 stores the new refresh frequency into the corresponding file. The flow of activity then goes back to block 303 as soon as the (new) refresh period expires, so as to reiterate the above described operations.

At the same time (in a completely asynchronous way), a generic client computer submits a request of an information item to the interface computer at block 342. The interface computer forwards the request to the server computer at block 345. Moving now to the swim-lane of the server computer, the flow of activity forks into two branches that are executed concurrently.

Considering in particular block 348, the server computer retrieves the available value of the desired information from the cache memory. The information so obtained is immediately returned to the interface computer at block 351. The interface computer in turn relays the information to the client computer at block 354. As a result, the information can be displayed on the client computer at block 357.

At the same time (at block 360 in the swim-lane of the server computer), the number of the preceding requests that have been submitted for the same information by all the client computers (in the last 1-5 minutes in the example at issue) is updated accordingly in the corresponding database. Considering now block 363, the interest index of the information is calculated as a function of the number of the preceding requests; for example, denoting with n the number of the preceding requests, with L a minimum frequency and with H a maximum frequency (for example, 1 s and 60 s, respectively), we can apply the following formula:

$$Ii = H - (H-L) \cdot e^{-n}$$

In this way, when n=0 the interest index takes its lowest value (Ii=H−H+L=L), whereas when n→∞ the interest index takes its highest value (Ii=H−0=H). This leads (being fr=Is·Ii) to a decrease of the refresh frequency for low numbers of the preceding requests (since the information is not of particular interest) and to an increase of the refresh frequency for high numbers of the preceding requests (since the information is very interesting).

The two branches then joint by returning to block 342 (in the swim-lane of the client computer). In this way, the same operations described-above are repeated as soon as a further request of information is submitted by the client computer.

Figure 4:
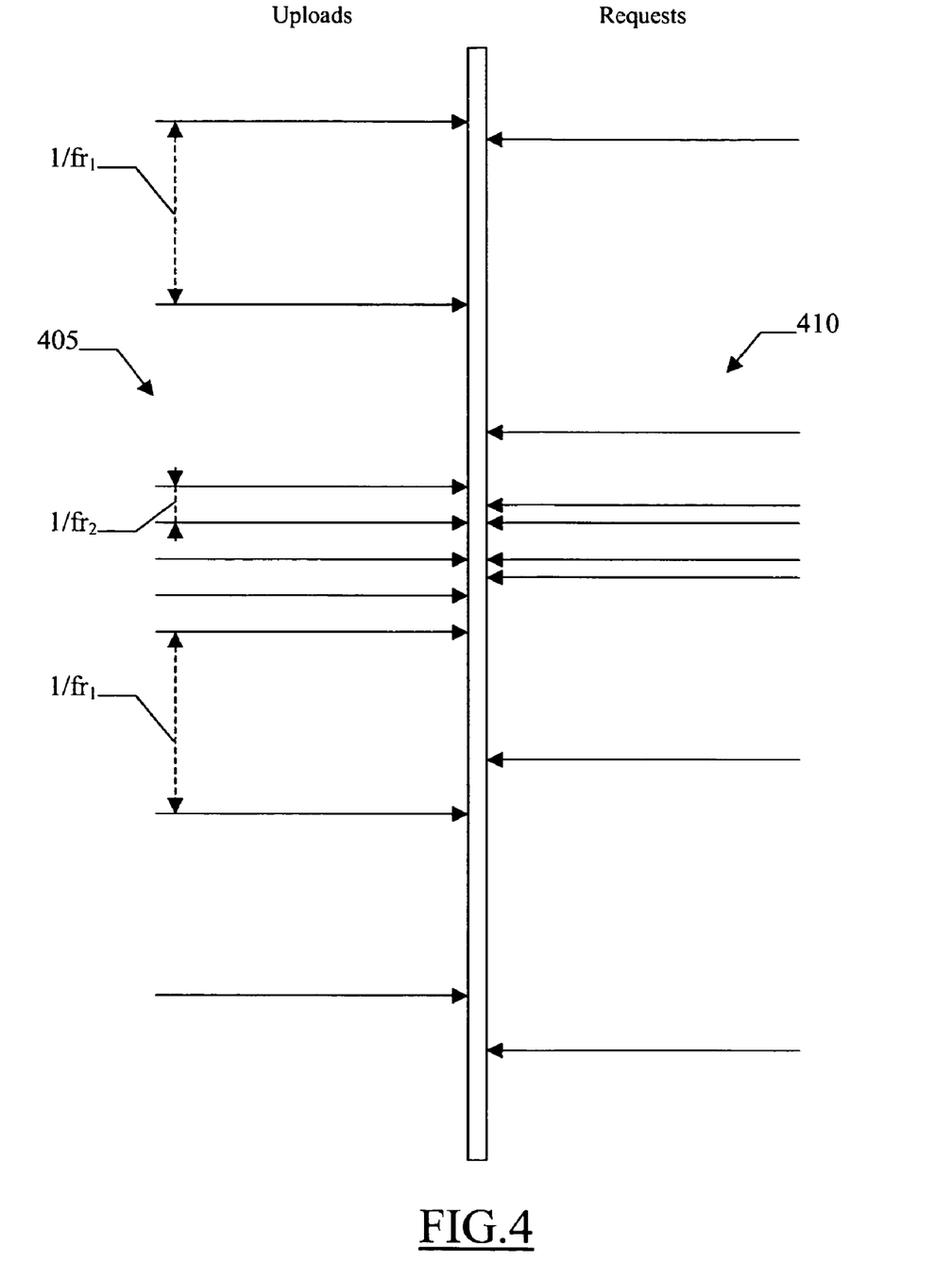
FIG. 4 is a timing diagram of an exemplary operation of the system.

A timing diagram relating to an exemplary operation of the above-described system is illustrated in FIG. 4. In this case, the uploads of the information from a generic source computer onto the server computer are denoted with 405; the corresponding requests that are submitted by the different client computers are instead denoted with 410.

As can be seen, in a normal situation the information is uploaded onto the server computer with a relatively low refresh frequency $fr_1$ (enough to satisfy the requests that are routinely submitted by the client computers). However, as soon as information of particular interest is generated by the source computer, the refresh frequency is increased accordingly ($fr_2$). In this way, up-to-date information is already available on the server computer for the high number of requests that will be submitted by the client computers. Once the situation returns to the normality, the refresh frequency returns to its previous value $fr_1$.

For example, in the monitoring application at issue the operators track the performance of the system every minute (so that a refresh frequency of 30 s is acceptable). However, when a problem arises they start downloading information with a very high frequency (such as every 1-5 s), in order to analyze the problem and possibly solve it. In this situation, a real time response of the system is of the utmost importance (for example, with a refresh frequency of 1 s), so as to allow the operators to evaluate the result of any correction action that has been enforced. Once the problem has been fixed, the situation returns to the normality.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, the reference to the monitoring application is merely illustrative and must not be interpreted in a limitative manner; indeed, the solution of the invention can be used to deliver news provided by press agencies, stock exchange data provided by multiple sites, and the like.

Similar considerations apply if the system has a different structure or includes equivalent components; moreover, the system can be based on any number of source computers and/or client computers (down to a single one), or the client computers can access the server computer directly (without any interface computer). Likewise, each computer can have another structure or it can be replaced with any data processing entity (such as a PDA, a mobile phone, and the like). Alternatively, the same information item can be provided by two or more source computers, or each source computer can generate two or more information items independently.

It should be noted that although the solution of the invention is specifically designed for a system working according to the push paradigm, the use of the devised solution in other environments is not excluded.

In any case, the numerical examples described above are merely illustrative and must not be interpreted in a limitative manner.

The principles of the invention should not be limited to the proposed formula for calculating the refresh frequency (and to the proposed types of significance index and/or interest index); for example, both indexes can be expressed as a time and a refresh period can be defined by their mean-square value, or the two indexes can be used to update a preceding value of the refresh frequency according to a predefined policy.

Moreover, other formulas for calculating the interest index are within the scope of the invention (for example, based on a hyperbolic law).

The concepts of the present invention are also applicable when different categories of information are taken into account (down to only two, for example, defined by the reaching of a threshold value by the monitoring data).

Alternative formulas for calculating the significance index from the probability of the current value of the information are also contemplated (such as based on its logarithm).

Likewise, the refresh frequency can be modulated in an equivalent way (for example, using a barrel-shift algorithm or a modulator of higher order).

In any case, the programs on the different computers can be structured in another way, or additional modules or functions can be provided; likewise, the different memory structures can be of different types, or can be replaced with equivalent entities (not necessarily consisting of physical storage media). Alternatively, the proposed solution can implement an equivalent method involving similar or additional steps.

Moreover, it will be apparent to those skilled in the art that the additional features providing further advantages are not essential for carrying out the invention, and may be omitted or replaced with different features.

For example, an implementation wherein the refresh frequency is based on the interest index only is within the scope of the invention. Vice-versa, it is expressly intended that the determination of the refresh frequency according to the significance index only is not excluded.

Alternatively, the interest index can be calculated from different statistics parameters characterizing a distribution of the preceding requests, or from any other indicator of an interest that have been demonstrated for the information by the client computers in the past.

Likewise, it is possible to determine the significance index of the current value of the information from any other indicator of the corresponding information content (for example, based on its entropy, quality, detail, and the like); alternatively, the significance index can also be set manually (such as for the news).

Without departing from the principles of the invention, the significance index can be calculated on the server computer and/or the refresh frequency can be calculated on each source computer directly.

Moreover, an implementation without any modulation of the refresh frequency is contemplated.

In any case, the programs can be distributed in any other computer readable medium (such as a DVD).

At the end, the method according to the present invention leads itself to be carried out with a hardware structure (for example, integrated in chips of semiconductor material), or with a combination of software and hardware.

The invention claimed is:

1. A computer program tangibly stored in a computer readable medium directly loadable into a working memory of a data processing system for delivering information in the data processing system when the computer program is run on the data processing system which cause the data processing system to perform the steps of:
    collecting a current value of the information item on the server entity from a corresponding source entity according to a corresponding refresh frequency;
    delivering the current value of the information item from the server entity to each of the at least one client entity in response to a corresponding request;
    characterized by the steps of
    determining an interest index of the information item, being indicative of an interest of the at least one client entity for the information item, according to preceding requests for the information item being submitted by the at least one client entity previously;
    updating the refresh frequency of the information item according to the corresponding interest index; and
    modulating the refresh frequency of the information item according to a random modulation value.

2. The computer program according to claim 1, further including the steps of:
    determining a significance index of the information item, being indicative of a significance of the current value of the information item for the at least one client entity, according to an information content of the current value of the information item; and
    updating the refresh frequency of the information item according to the corresponding significance index.

3. The computer program according to claim 2, wherein the step of determining the significance index of the information item includes:
    classifying the current value of the information item into one of a plurality of categories, each category being associated with a predefined significance index; and
    assigning the predefined significance index associated with the category to the information item.

4. The computer program according to claim 2, wherein the step of determining the significance index of the information item includes:
    estimating a probability of the current value of the information item according to a set of preceding values of the information item being collected previously; and
    calculating the significance index according to said probability.

5. The computer program according to claim 2, wherein the computer program further includes the steps under the control of the corresponding source entity of:
    generating the current value of the information item according to the corresponding refresh frequency;
    determining the significance index of the information item; and
    transmitting the current value of the information item and the corresponding significance index to the server entity; and the steps under the control of the server entity of:
    caching the current value of the information item;
    updating the refresh frequency of the information item according to the corresponding interest index and significance index; and
    returning the refresh frequency of the information item to the source entity.

6. The computer program according to claim 1, wherein the step of determining the interest index of the information item includes:
    storing an indication of a number of the preceding requests for the information item being submitted by the at least one client entity in a predetermined period; and
    calculating the interest index according to said number.

7. A data processing system including a server entity, at least one client entity, means for collecting a current value of each of at least one information item on the server entity from a corresponding source entity according to a corresponding refresh frequency, and means for delivering the current value of the information item from the server entity to each of the at least one client entity in response to a corresponding request, characterized in that the data processing system further includes means for determining an interest index of the information item, being indicative of an interest of the at least one client entity for the information item, according to preceding requests for the information item being submitted by the at least one client entity previously, means for updating the refresh frequency of the information item according to the corresponding interest index, and means for modulating the refresh frequency of the information item according to a random modulation value.

8. The data processing system according to claim 7, further including means for determining a significance index of the information item, being indicative of a significance of the current value of the information item for the at least one client entity, according to an information content of the current value of the information item; and means for updating the refresh frequency of the information item according to the corresponding significance index.

9. The data processing system according to claim 8, wherein the means for determining the significance index of the information item includes means for classifying the current value of the information item into one of a plurality of categories, each category being associated with a predefined significance index; and means for assigning the predefined significance index associated with the category to the information item.

10. The data processing system according to claim 8, wherein the means for determining the significance index of the information item includes means for estimating a probability of the current value of the information item according to a set of preceding values of the information item being collected previously; and means for calculating the significance index according to said probability.

11. The data processing system according to claim 8, wherein the data processing system further includes the means under the control of the corresponding source entity for: generating the current value of the information item according to the corresponding refresh frequency; determining the significance index of the information item; and transmitting the current value of the information item and the corresponding significance index to the server entity; and the means under the control of the server entity for: caching the current value of the information item; updating the refresh frequency of the information item according to the corresponding interest index and significance index; and returning the refresh frequency of the information item to the source entity.

12. The data processing system according to claim 7, wherein the means for determining the interest index of the information item includes means for storing an indication of a number of the preceding requests for the information item being submitted by the at least one client entity in a predetermined period; and means for calculating the interest index according to said number.

* * * * *